A. J. CHAPMAN.
VEGETABLE CUTTER.
No. 26,253.  Patented Nov. 29, 1859.
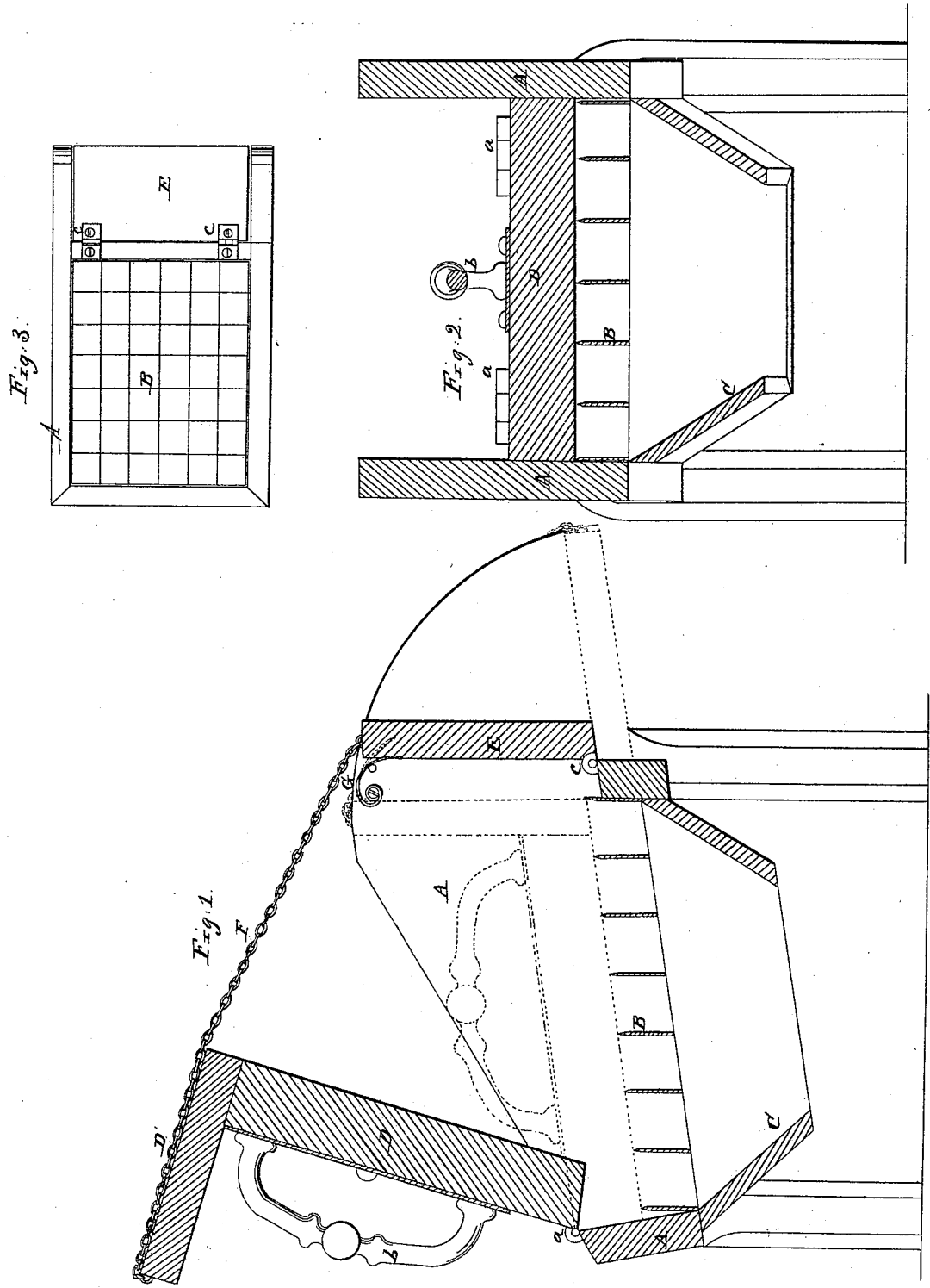

UNITED STATES PATENT OFFICE.

ANDREW J. CHAPMAN, OF SCIPIO, NEW YORK.

VEGETABLE-CUTTER.

Specification of Letters Patent No. 26,253, dated November 29, 1859.

*To all whom it may concern:*

Be it known that I, A. J. CHAPMAN, of Scipio, in the county of Cayuga and State of New York, have invented a new and useful Improvement in Vegetable-Cutters; and I do hereby declare that the following is a full, clear, and exact description of the same, reference being had to the accompanying drawings, forming a part of this specification, in which—

Figure 1 is a longitudinal section of my improved vegetable cutter. Fig. 2 is a transverse section of the same, and Fig. 3 is a top view of the same.

Similar letters of reference, in each of the several figures indicate corresponding parts.

The nature of my invention consists in the arrangement and combination of the hinged tail-board, hinged follower and stationary slatted cutting bed, when constructed and operating in the manner and for the purpose hereinafter set forth.

To enable others, skilled in the art, to make and use my invention, I will proceed to describe its construction and operation.

A represents a cuting box mounted on legs and furnished with a backwardly inclining iron slatted bed B; the slats being reduced to a knife edge at their top so as to cut.

C, is a funnel shaped hopper arranged under this bed so as to collect and conduct off into a proper receiver, the cut vegetables.

D, D', is a combined follower and guard board hinged as at *a*, to the rear of the box A, and furnished with a handle *b*, by which it is raised and lowered.

E, is a combined feed and guard board hinged as at *c*, to the front of the cutting box, it is also connected by a chain F, or other connecting device to the front end of the follower, as shown.

G, is a spring for assisting in the automatic adjustment of the combined feed and guard board when a chain is used. This spring is unnecessary when a stiff connection as a substitute for the flexible one F, is employed.

The operation is as follows: The parts being adjusted as shown in red, a cabbage or other vegetable is placed on the combined feed and guard board E, it resting on E and against the guard board D', of follower D. The follower is now raised as shown in black. By being thus raised, the follower no longer offers obstruction to the vegetable and it, owing to the bed being inclined, and its own gravity, rolls down into the box. The follower is now brought down with a force sufficient to cause the edged slats of the cutting bed to cut through the vegetable. While the follower is in this position, another vegetable is placed on the feed board, and when the follower is raised, the feed board, by being connected with it, rises to a vertical position and thus causes the vegetable to roll into the box ready for another descent of the follower. A second descent of the follower causes that portion of the vegetable first cut, which remained between the edged slats of the bed to fall into the hopper which collects and conducts them off into a receiver.

What I claim as my invention and desire to secure by Letters Patent, is—

The arrangement and combination of the hinged guard or feed board hinged follower and stationary slatted cutting bed when constructed and operating substantially in the manner and for the purposes set forth.

ANDREW J. CHAPMAN.

Witnesses:
KUKEL SHAW,
H. HOWLAND ARTEMAS WARD.